United States Patent
Graf et al.

(10) Patent No.: US 9,033,279 B2
(45) Date of Patent: May 19, 2015

(54) BAGGAGE HOLDER FOR AN AIRCRAFT AND AIRCRAFT HAVING THE BAGGAGE HOLDER

(71) Applicants: Oleg Graf, Illertissen (DE); Max Failenschmid, Neu-Ulm (DE); Ulrich Evers, Ulm (DE); Annica Dieterich, Ulm (DE); Simon Merz, Wasseralfingen (DE); Michael Zinke, Postbauer-Heng (DE)

(72) Inventors: Oleg Graf, Illertissen (DE); Max Failenschmid, Neu-Ulm (DE); Ulrich Evers, Ulm (DE); Annica Dieterich, Ulm (DE); Simon Merz, Wasseralfingen (DE); Michael Zinke, Postbauer-Heng (DE)

(73) Assignee: DIEHL AIRCABIN GMBH, Laupheim (DE)

( * ) Notice: Subject to any disclaimer, the term of this patent is extended or adjusted under 35 U.S.C. 154(b) by 243 days.

(21) Appl. No.: 13/679,244

(22) Filed: Nov. 16, 2012

(65) Prior Publication Data

US 2013/0119200 A1    May 16, 2013

(30) Foreign Application Priority Data

Nov. 16, 2011    (DE) .......................... 10 2011 118 548

(51) Int. Cl.
   *B64D 11/00*    (2006.01)
(52) U.S. Cl.
   CPC ............... *B64D 11/003* (2013.01); *Y02T 50/46* (2013.01)
(58) Field of Classification Search
   CPC ....................................................... B64D 11/03
   USPC ....................................... 244/118.5; 312/248
   See application file for complete search history.

(56) References Cited

U.S. PATENT DOCUMENTS

| 7,234,666 B2 * | 6/2007 | Novak et al. ................ 244/118.5 |
| 7,455,263 B2 * | 11/2008 | Lau et al. ................... 244/118.5 |

(Continued)

FOREIGN PATENT DOCUMENTS

| DE | 100 30 129 A1 | 1/2002 |
| DE | 10 2009 057 014 A1 | 6/2011 |
| EP | 2 492 194 A1 | 8/2012 |

OTHER PUBLICATIONS

Catalog from Harmonic Drive LLC. Retrieved from internet archive of http://www.harmonicdrive.net on Dec. 29, 2009.*

(Continued)

*Primary Examiner* — Brian M O'Hara
*Assistant Examiner* — Michael Kreiner
(74) *Attorney, Agent, or Firm* — Scully, Scott, Murphy & Presser, P.C.

(57) ABSTRACT

Baggage compartment 1 for an aircraft, wherein the baggage compartment 1 comprises a housing 2 and a baggage holder 3, wherein the baggage holder 3 is swivel-mounted about a swivel axis A in the housing 2, wherein the swivel axis A intersects, in its longitudinal extent, a holder side wall 32 of the baggage holder 3 and/or a housing side wall 21 of the housing 2, wherein the baggage holder 3 can be moved from a closed position G into an open position Ö with a first swivel movement S1 and the baggage compartment 1 is opened and wherein the baggage holder 3 can be moved from the open position Ö into the closed position G with a second swivel movement S2 and the baggage compartment 1 is closed, wherein the baggage compartment 1 comprises a drive device 6 having at least one drive motor 9, wherein the drive device 6 is designed to drive the baggage holder 3 during the first and/or second swivel movement S1; S2 and to open or close the baggage compartment 1, wherein the drive device 6 is connected to the holder side wall 32 on one side and to the housing side wall 21 on the other side.

15 Claims, 2 Drawing Sheets

(56) References Cited

U.S. PATENT DOCUMENTS

| | | |
|---|---|---|
| 7,723,935 B2* | 5/2010 | Kneller et al. .................. 318/286 |
| 7,883,055 B2* | 2/2011 | Bock ........................... 244/118.5 |
| 7,887,008 B2 | 2/2011 | Lamoree et al. |
| 2006/0132007 A1 | 6/2006 | Beckley |
| 2008/0073462 A1* | 3/2008 | Wolf et al. .................. 244/118.1 |
| 2008/0078871 A1* | 4/2008 | Munson et al. ............. 244/118.5 |
| 2010/0288879 A1* | 11/2010 | Bock et al. ................. 244/118.5 |
| 2011/0133029 A1 | 6/2011 | Berkenhoff et al. |
| 2012/0038254 A1* | 2/2012 | Rafler ........................... 312/242 |

OTHER PUBLICATIONS

English Abstract of WO 01/99254 A1, dated Dec. 27, 2001.

\* cited by examiner

BAGGAGE HOLDER FOR AN AIRCRAFT AND AIRCRAFT HAVING THE BAGGAGE HOLDER

BACKGROUND OF THE INVENTION

The invention relates to a baggage holder for an aircraft and an aircraft having the baggage holder.

DISCUSSION OF THE PRIOR ART

Baggage holders for aircraft are often disposed in the passengers' overhead area. They are extensively known as hatracks. A current variant of the hatrack comprises a housing with a swivel-mounted chute integrated therein. To open and stow items of baggage in the hatrack, the chute is swivelled out of the housing. By swivelling the chute back into the housing the hatrack is closed, which means that the items of baggage are safely stowed therein during the flight. Baggage holders which are opened and closed again in a motor-driven manner are already known in the art.

For example, publication U.S. Pat. No. 7,887,008 B2, which probably constitutes the closest prior art, discloses a baggage holder having a chute and a housing, wherein the chute is swivel-mounted in the housing. The baggage holder comprises an electrically driven actuator which is designed, as a linear motor, to move the chute into an open or closed position. The baggage holder furthermore comprises a sensor which is connected to the actuator and detects the electrical current for operating the actuator and uses the current level to determine a loaded or overloaded state of the chute. A control mechanism of the baggage holder triggers a disconnection of the actuator, e.g. in the case of the chute being overloaded.

The problem addressed by the invention is that of proposing a functionally improved and easy-to-use baggage compartment.

SUMMARY OF THE INVENTION

A baggage compartment is proposed, which is suitable and/or designed for an aircraft, particularly a passenger aircraft. The baggage compartment is preferably capable of being integrated in an aircraft cabin and is particularly designed to be fitted in an overhead area above the rows of passengers. The baggage compartment is preferably designed as an element or as a segment of a hatrack or it forms the hatrack.

The baggage compartment comprises a housing, which preferably exhibits mechanical interfaces for securing the baggage compartment in the aircraft cabin. The housing particularly comprises at least two housing side walls and a rear wall, wherein further baggage compartments or end sections of a row of baggage compartments are preferably attached to the two housing side walls. In a preferred embodiment, the baggage compartment, particularly the housing, is in the form of a plastic part, particularly a plastic injection moulding.

The baggage compartment further comprises a baggage holder, which comprises two holder side walls, a holder base, a front side and a rear side. It is particularly preferable for the baggage holder to be designed as a plastic part, particularly a plastic injection moulding. It is preferable for the baggage holder to be designed as a chute, particularly as a pivot bin. In this function the baggage holder exhibits a receiving opening through which it can be loaded with items of baggage, particularly hand baggage.

The baggage holder is swivel-mounted about a swivel axis in the housing, wherein the swivel axis intersects, in its imaginary longitudinal extent, the holder side wall and/or the housing side wall, in particular extends through them.

By means of a first swivel movement, the baggage holder can be moved from a closed position into an open position. The baggage compartment is opened by the first swivel movement, wherein the receiving opening of the baggage holder is opened for the stowage of items of baggage therein.

By means of a second swivel movement, the baggage holder is moved from the open position into the closed position, as a result of which the baggage compartment is closed and the pieces of baggage stowed therein. There is preferably no access to the receiving opening in the closed position.

The baggage compartment comprises a drive device having at least one drive motor. The drive device is designed to drive the baggage holder during the first and/or second swivel movement and to open or close the baggage compartment.

The drive device preferably drives the baggage compartment such that performs the first or second swivel movement at a constant speed.

The baggage compartment preferably comprises a locking mechanism, through which the baggage holder can be locked to the housing when the baggage compartment is closed. The locking mechanism is preferably in the form of an electromechanical lock.

It is preferable for the baggage compartment to comprise at least one control mechanism or for it to be connectable or connected thereto. A user, e.g. a passenger or cabin staff member, can use the control mechanism to operate the baggage holder, particularly to unlock it and trigger performance of the swivel movements. The baggage holder preferably performs the first swivel movement automatically and/or independently upon and/or following actuation of the control mechanism until it adopts the open position and the baggage compartment is completely open. With the first swivel movement it is possible for the baggage holder to be gravity-assisted and at the same time driven into the open position by the drive device. It is preferable for the first swivel movement to occur in a guided manner and at constant speed.

Following repeated use of the control mechanism by the user, the baggage holder is automatically closed again by the drive of the drive device. Consequently, the user need advantageously use no or only a small amount of force, in order to open or close the baggage compartment. It is advantageous that the baggage compartment is extremely user-friendly in design and the loading of said baggage compartment is more convenient.

According to the invention, the drive device is connected to the holder side wall on one side and to the housing side wall on the other side. Preferably, the drive device has mechanical interfaces for direct and immediate securing to the holder side wall and to the housing side wall. For example, the drive device has a first flange for securing to the holder side wall in a positive-locking and/or non-positive-locking manner, and a second flange for securing to the housing wall. It is particularly preferable for the first flange to be screwed to the holder side wall and for the second flange to be screwed to the housing side wall.

It is possible for the drive device to be arranged between the holder side wall and the housing side wall. Optionally, the drive device can also be arranged adjacent to or next to the holder side wall and/or the housing side wall. It is particularly preferable for the drive device to be integrated into a receiving opening in the holder side wall on one side and/or into a receiving opening in the housing side wall on the other side and to extend over the intermediate space between the two side walls. Preferably, the drive device is arranged in that region of the side walls in which the swivel axis intersects them.

It is advantageous for the drive device to be able to be integrated into the baggage compartment in a compact and space-saving manner on account of its arrangement according to the invention.

In a preferred embodiment of the invention, the drive device is arranged on the swivel axis, in particular in its imaginary longitudinal extent. It is particularly preferable for a motor shaft of the drive motor to extend coaxially to the swivel axis. In particular, the drive device is arranged at a pivot point or at a hub of the baggage holder. It is advantageous here that, on account of the arrangement of the drive device at the pivot point or the hub and/or on account of the coaxial extent of the motor shaft to the swivel axis, a high efficiency of the drive device can be provided.

In a preferred embodiment of the invention, the drive motor is designed as an external rotor motor. An external rotor motor is an electric motor in which the stationary part of the motor (stator) is arranged on the inside and surrounded by a moved component (rotor). For example, the rotor is formed from at least one annular permanent magnet oriented radially to the swivel axis or from a multi-pole magnetized ring.

Preferably, the drive motor is in the form of an external rotor torque motor which can be particularly classified among the so-called "slow runners". The external rotor torque motor is in the form of a direct current motor, wherein an inductor is wound onto the stator and the magnets are accommodated by the rotor.

High acceleration and deceleration values can advantageously be provided by the external rotor torque motor design. In particular, a torque preferably of at least 100 Nm, particularly at least 1000 Nm, especially at least 10000 Nm can be produced.

An external rotor torque motor is advantageously dynamically stable and torsionally rigid in design. Particularly by means of the external rotor torque motor, a position, especially the open and closed position of the baggage holder, can be precisely approached. It is furthermore advantageous that the external rotor torque motor is distinguished by a long service life and freedom from maintenance for the most part, as it only has a small number of expendable parts.

In a possible structural embodiment of the invention, the drive device comprises a transmission which is designed to convert the torque of the drive motor and, depending on the installation position of the drive mechanism, to transmit it to the baggage holder or the housing. It is preferable for the transmission to have only one transmission stage.

For example, the transmission is in the form of a harmonic drive transmission. In a preferred structural embodiment, the harmonic drive transmission has an elliptical steel disc, preferably with a shrunk-on rolling bearing, wherein the steel disc forms a drive shaft of the transmission. The harmonic drive transmission preferably comprises a thin-walled deformable cylindrical steel bushing with a flexspline, which forms a drive shaft of the harmonic drive transmission. The harmonic drive transmission preferably exhibits a rigid cylindrical outer ring with a circular spline, wherein the flexspline of the steel bushing meshes with the circular spline of the outer ring. For functional implementation, the flexspline of the steel bushing has fewer teeth than the circular spline of the outer ring.

When the elliptical steel disc is driven by the external rotor motor, the steel bushing is deformed via the bail bearing, as a result of which the flexspline of the steel bushing meshes with the circular spline of the outer ring in the area of the large elliptical axle. Due to the fact that the outer ring is arranged in a fixed, rotation-free manner, the output shaft lags behind while the drive shaft rotates, particularly in accordance with the smaller number of teeth compared with the outer ring. The harmonic drive transmission therefore preferably offers high transmissions, e.g. roughly 160:1, wherein 160 revolutions of the motor shaft or the drive shaft are transmitted into one revolution of the output shaft of the harmonic drive transmission.

Generally, the harmonic drive transmission has high rigidity. It is advantageous for the harmonic drive transmission to have a very compact construction and to be designed to have freedom from maintenance for the most part. On account of a backlash-free output of the harmonic drive transmission, the baggage holder can advantageously be moved with positional accuracy into the open or closed position.

It is preferable for an output shaft of the transmission to extend coaxially to the swivel axis, in particular in the longitudinal extent thereof. It is particularly preferable for the output shaft of the transmission likewise to be arranged coaxially to the motor shaft. Optionally, the output shaft and the motor shaft are designed as hollow shafts. Preferably, the output shaft is coupled to the baggage holder, in particular to its side wall, as a result of which direct and immediate force transmission to the baggage holder can take place. In particular, it is possible to dispense with means for force transmission, such as chains, belts or cords, for example. As a result, the number of components can be reduced and costs and weight can be saved.

In a preferred embodiment of the invention, the baggage compartment has a passive mechanical axle which extends along the swivel axle through the hollow space in the output and motor shaft. In particular, the drive motor engages around the passive axle. Preferably, the passive axle couples the housing to the baggage holder, as a result of which the stability of the baggage compartment can advantageously be increased. It is also possible in the context of the invention for the housing and the baggage holder to be connected together only via the drive device.

In a particularly preferred installation form of the drive device, the drive motor is directed at the baggage holder and the transmission is directed at the housing. As a result of this installation form, the motor rotates during operation of the drive device with the baggage holder and drives the latter, while the output shaft of the housing is connected in a fixed manner to the housing side wall.

In another possible installation form of the drive device, the transmission is directed in the direction of the baggage holder and the drive motor is directed in the direction of the housing. In this case, the stator is connected in a fixed manner to the housing side wall. The output shaft of the transmission rotates in this case together with the baggage holder and drives the latter.

Optionally, the baggage compartment has at least one energy storage mechanism. Preferably, the energy storage mechanism is designed, as a mechanically working energy storage mechanism, to store kinetic energy emitted during the first swivel movement of the baggage holder and to release it again during the second swivel movement of the baggage holder. For example, the energy storage mechanism is designed as a compression spring or as a pneumatic, electrical or hydraulic cylinder.

It is particularly preferable in the context of the invention for the energy storage mechanism to work electrically, e.g. to be designed as a capacitor. When connected to a power source, the capacitor stores electric charge, which is preferably released again as electrical energy to support the second swivel movement of the baggage holder.

It is advantageous that through the energy release of the energy storage mechanism, the energy or power consumption of the drive motor required to close the baggage compartment can be reduced.

In a preferred embodiment of the invention, the baggage compartment comprises a control mechanism or is connected or connectable thereto. The control mechanism is preferably designed as a Programmable Logic Controller (PLC). Optionally, the control mechanism comprises an evaluation mechanism for evaluating incoming electrical signals. For example, the control mechanism is integrated locally on the housing or centrally in an aircraft control system.

In a further possible embodiment of the invention, the baggage compartment comprises a measuring device, in particular a Hall sensor, for measuring the electrical motor current. The measured motor current is conveyed to the evaluation mechanism by the electric signals, said evaluation mechanism evaluating said signals. In particular, the evaluation mechanism calculates a loading weight for the baggage holder using the motor current and transmits this to the control mechanism. In particular, the motor current may be readjusted by the control mechanism depending on the calculated loading weight.

In a further possible embodiment of the invention, the control mechanism triggers the energy storage mechanism depending on the loading weight determined for the baggage holder. At a loading weight smaller than a first limit loading weight of 25 kg, for example, the energy storage mechanism is preferably not connected, in which case only the drive motor takes over the drive of the baggage holder. At a loading weight in excess of the first limit loading weight, e.g. over 25 kg, the control mechanism triggers the connection of the energy storage mechanism, in order to support the drive motor with the baggage holder drive. The energy storage mechanism therefore supports the drive device in a software-controlled manner, particularly depending on the loading weight. In particular, the drive motor must transmit less force to the baggage holder during the second swivel movement due to the connection of the energy storage mechanism, as a result of which it can be advantageously operated in an energy-saving manner.

Furthermore, if there is uneven loading among a plurality of baggage compartments, it can also be guaranteed that all baggage compartments can be opened or closed at the same constant speed. In particular, a sharply varying loading weight in the baggage compartments has no effect on the swivel movements of the baggage holder.

If, however, a loading weight greater than a second limit loading weight of e.g. 50 kg is determined, the baggage holder is overloaded. In this case, the control mechanism preferably stops the drive motor, so that the baggage holder remains open until the maximum permitted loading weight is no longer exceeded. Overloading can therefore be prevented and hot-running or overloading of the drive motor prevented.

When the overloading is corrected by removing items of baggage from the baggage holder, the control mechanism triggers the drive motor again and, as an optional addition, the energy storage mechanism, in order to close the baggage compartment.

By determining the loading weight with the help of the electric motor current, items of baggage that have been left in the aircraft's baggage compartments can also be advantageously detected.

In a preferred embodiment of the invention, the drive device comprises a rotary encoder which is designed to detect an angle of rotation of the motor shaft. The measured angle of rotation of the motor shaft is preferably transmitted to the evaluation mechanism, which uses this to calculate an opening angle for the baggage holder and transmits this to the control mechanism. Depending on the opening angle, said control mechanism triggers the drive motor to drive the baggage holder during the first or second swivel movement until said baggage holder adopts the open position or the closed position.

The rotary encoder may be optionally designed as an absolute encoder or preferably as an incremental encoder. With the incremental encoder design, very precise positional values can be determined for the baggage holder, due to the advantageously high speed of the drive motor and due to the transmission ratio. It is thereby guaranteed that the baggage holder can be moved into the open position or closed position with positional accuracy. As an optional addition, the locking mechanism reports the complete locking of the baggage compartment to the control mechanism.

In a possible structural embodiment of the invention, the baggage compartment has anti-trap protection, which is advantageously disposed on the closing edges of the housing and/or of the baggage holder. The anti-trap protection preferably detects whether there are any obstacles between the closing edges when the baggage holder is closing. If an obstacle is detected, a signal is sent to the control mechanism, which then stops the second swivel movement of the baggage holder until the obstacle has been removed and is no longer detected by the anti-trap protection. In particular, the closing operation only continues once the obstacle has been removed and after the all-clear has been given by the anti-trap protection to the control mechanism. Any risk of injury, e.g. risk of fingers being crushed, is therefore minimized for users through the integration of the anti-trap protection.

The control mechanism of the baggage compartment is preferably arranged as a switch or push-button on the front of the baggage holder. For example, the user may unlock the baggage compartment by activating the control mechanism and thereby initiate the first swivel movement. Where necessary, e.g. during a power cut or mechanical system failure, the baggage compartment may also be unlocked and/or opened manually.

The second swivel movement is preferably initiated by a fresh actuation of the control mechanism and the baggage compartment is closed again and locked. The second swivel movement may, alternatively, also be triggered as a manual lifting of the baggage holder. In this case, the control mechanism triggers the drive motor when the baggage holder has not been in the open position over a defined period of time and the drive motor has not yet been activated.

Alternatively or as an optional addition, the control mechanism may be in the form of a remote control with which the cabin staff, for example, can control a plurality of or all baggage compartments within the aircraft centrally. This may be advantageous, e.g. when the aircraft is taking off and/or landing. It is also possible that the cabin staff is able to activate the baggage compartments in the aircraft singly or individually.

In a possible embodiment of the invention, the baggage compartment can be connected to a display device. Operating states, such as, for example, the open or closed position of the baggage compartment(s) on the aircraft, are preferably displayed by the display device. It is also particularly preferable for error messages, e.g. baggage holder overload, failure of mechanical and/or electrical components, faulty operation, misuse by users, etc. to be displayed on the display device. The display on the display device is particularly controlled by the control mechanism.

It is preferable for the display device to be arranged within the area of responsibility of the cabin staff, so that it can convey necessary information to them visually. It is also possible for the display device to be attached to the baggage compartment centrally, in order to inform users individually.

The display device is optionally in the form of an information panel with a plurality of multi-coloured light-emitting diodes (LEDs). Alternatively, the display device may be in the form of a screen or display, particularly a liquid-crystal display.

BRIEF DESCRIPTION OF THE DRAWINGS

Further features, advantages and effects of the invention emerge from the following description of preferred exemplary embodiments of the invention. In these.

Identical parts or parts which correspond to one another are each provided with the same reference number in the figures.

DETAILED DESCRIPTION OF THE INVENTION

Figure 1:
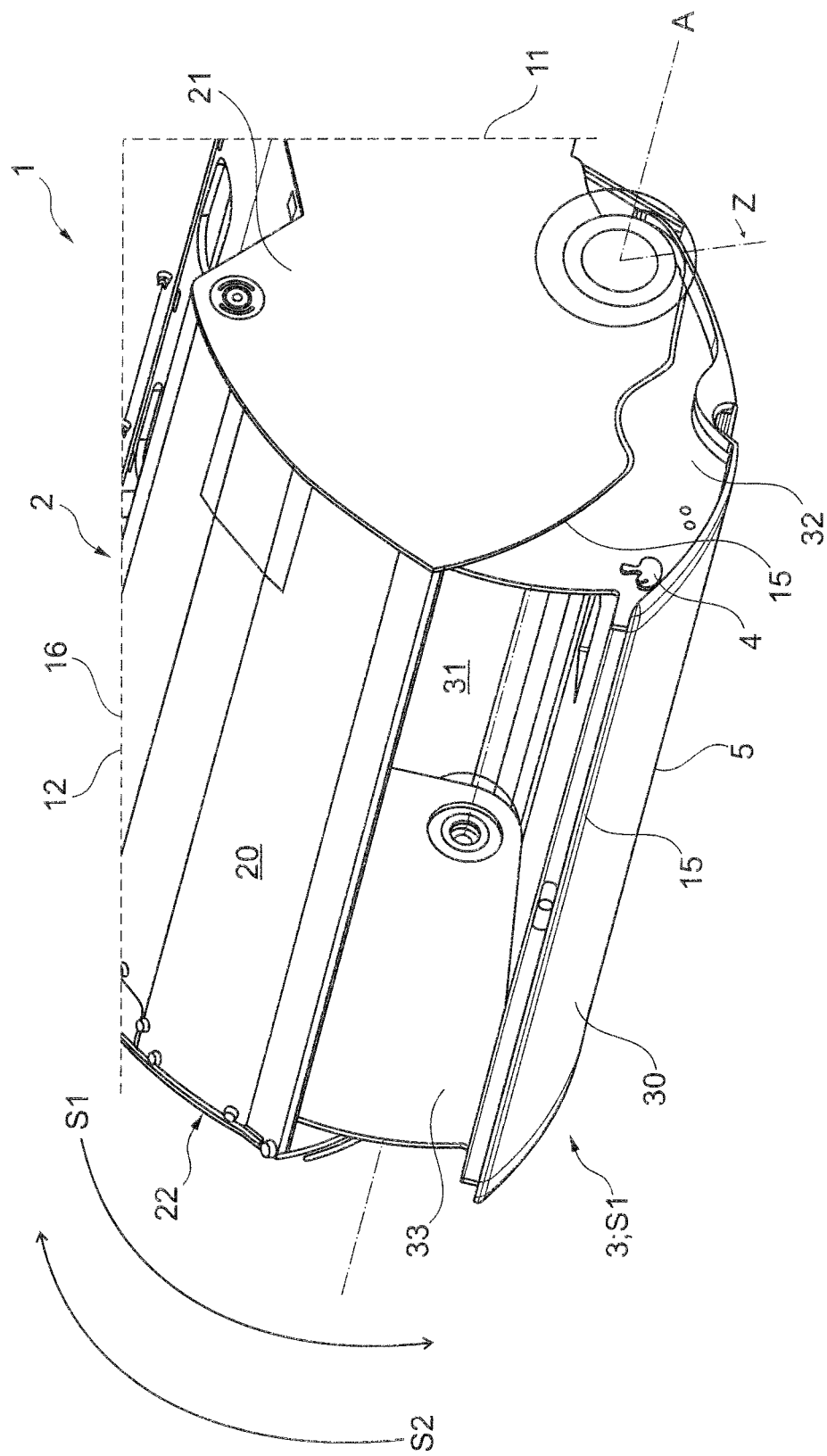
FIG. 1 shows a perspective side view of a baggage compartment.

FIG. 1 shows a perspective side view of a baggage compartment 1 as an exemplary embodiment of the invention. The baggage compartment 1 is suitable and/or designed for integration in an aircraft, particularly a passenger aircraft, in an overhead area of passengers. It is in the form of a hatrack or part of a hatrack.

The baggage compartment 1 has a housing 2 and a baggage holder 3 arranged therein. The housing 2 has a housing upper side 20 and two housing side walls 21, 22. It is securable or secured in an immovable fashion to an aircraft wall.

The baggage holder 3 is in the form of a chute or a pivot bin and is disposed between the housing side walls 21; 22 in the housing 2. The baggage holder 3 comprises a front side 30, a rear side 31 and two holder side walls 32; 33, which together enclose a receiving opening for items of baggage.

The holder side walls 32; 33 are arranged adjacent to the housing side walls 21; 22 and run parallel or virtually parallel thereto.

The baggage holder 3 is swivel-mounted about a swivel axis in the housing 2. The swivel axis A intersects, in its longitudinal extent, the housing side walls 21; 22 and the holder side walls 32; 33.

By means of a first swivel movement B1 about the swivel axis A, the baggage holder 3 is swivelled out of the housing 2 and adopts an open position Ö, as a result of which the baggage compartment 1 is opened. In the open position Ö the receiving opening is opened for stowage by an aircraft passenger. FIG. 1 shows the open baggage compartment 1 with the baggage holder 3 in the open position Ö.

By means of a second swivel movement B2, which runs counter to first swivel movement B1, the baggage holder 3 is swivelled back into a closed position G which is not shown and the baggage compartment 1 is closed. In the closed position G the receiving opening of the housing upper side 20 is covered and is not visible and/or accessible to the passenger.

The baggage compartment 1 exhibits a locking mechanism 4, with which the baggage holder 3 can be locked in the housing 2. In the locked position, the baggage compartment 3 cannot be manually opened and the baggage holder 3 cannot be swivelled out of the housing 2. The locking mechanism 4 is in the form of an electromechanical lock.

The baggage compartment 1 comprises at least one drive device 6, which has e.g. a circular or substantially circular outer contour and is arranged on the swivel axis, in particular in the region of or close to the point of intersection of the swivel axis A with the first housing side wall 21. Thus, the drive device 6 is designed, as a hub drive for the baggage holder 3, to drive the baggage holder 3 during the first and/or second pivot movement S1; S2 or to support the latter and to open or to close the baggage compartment 1.

The housing side wall 21 and the first holder side wall 32 have receptacles for the drive device 6, the latter being positioned therein. Thus, the drive device 6 extends from the first housing side wall 21 to the first holder side wall 32, wherein it is connected to the side walls 21; 32 preferably immediately or directly in a positive-locking and/or non-positive-locking manner.

The baggage compartment 1 comprises an energy storage mechanism 11, which is not shown and is designed to support the second swivel movement S2 of the baggage holder 3 and to relieve the load on the drive motor 9 when the baggage holder 3 is driven during the second swivel movement S2. The energy storage mechanism 11 is designed as a capacitor which, when connected to a power supply, stores electric charge and releases it again as electrical energy during the second swivel movement S2. Thus, the power consumption of the drive motor 9 can be reduced, in particular when the baggage holder is heavily laden.

Alternatively or as an optional addition, the energy storage mechanism 11 can also be designed to work mechanically, wherein it can be designed e.g. as a compression spring or as a pneumatic or hydraulic lifting cylinder. In particular, the mechanically working energy storage mechanism 11 stores the kinetic energy released during the first swivel movement S1 of the baggage holder 3 and releases it again during the second swivel movement S2.

The baggage compartment 1 is connectable or connected to a control mechanism 12, in particular a Programmable Logic Controller (PLC). The control mechanism 12 comprises an evaluation mechanism which evaluates signals transmitted to it and communicates them to the control mechanism 11. Depending on the evaluated signals, the control mechanism 11 triggers the drive device 6 and/or the energy storage mechanism 11.

The baggage compartment 1 comprises a control mechanism 5, which is arranged as a pushbutton or a switch, e.g. on the front side of the holder 30. When the control mechanism 5 is manually actuated by the passenger, the locking mechanism 4 is unlocked, so that the baggage compartment 1 can be opened.

Alternatively or as an optional addition, the control mechanism 5 may be in the form of a remote control with which the locking mechanism 4 can be locked or unlocked from a distance. In this case it is possible, for example, for an aircraft crew or cabin staff to be able to lock or unlock all baggage compartments arranged in the aircraft simultaneously and thereby control these centrally. Likewise, each individual baggage compartment 1 can be individually actuated.

The baggage compartment 1 comprises anti-trap protection 15, which extends along a closing edge of the housing 2 and/or of the baggage holder. The anti-trap protection 15 is designed as a sensor mechanism to detect an obstacle between a closing edge of the baggage holder 3 and the closing edge of the housing 2, e.g. due to passengers trapping their fingers, and to communicate this to the control mechanism 11 via a corresponding signal. When the signal is received, said control mechanism stops the second swivel movement S2 of the baggage holder 3 by deactivating the drive device 6 and, as an optional addition, the energy storage mechanism 11. A risk of injury to passengers can thereby be reduced. As soon as the obstacle has been removed or eliminated, the control mechanism 12 restarts the drive device 6, as a result of which the second swivel movement S2 is continued and the baggage compartment 1 is closed.

A plurality of error sources which take effect during abnormal operation of the baggage compartment 1 are taken into account in the programming of the control mechanism 12. Possible abnormal processes include, for example, failure of electronic/mechanical components, incorrect operation/misuse by users, trapping of objects, etc. Error sources of this kind, but also different operating states and/or warning indicators of the baggage compartment 1 can be displayed on a display mechanism 16 connectable or connected to the baggage compartment. The display mechanism 16 is disposed within the area of responsibility of the cabin staff and/or right on the baggage compartment 1, for example, so that the user of the baggage compartment 1 can be informed of the operating status.

Figure 2:
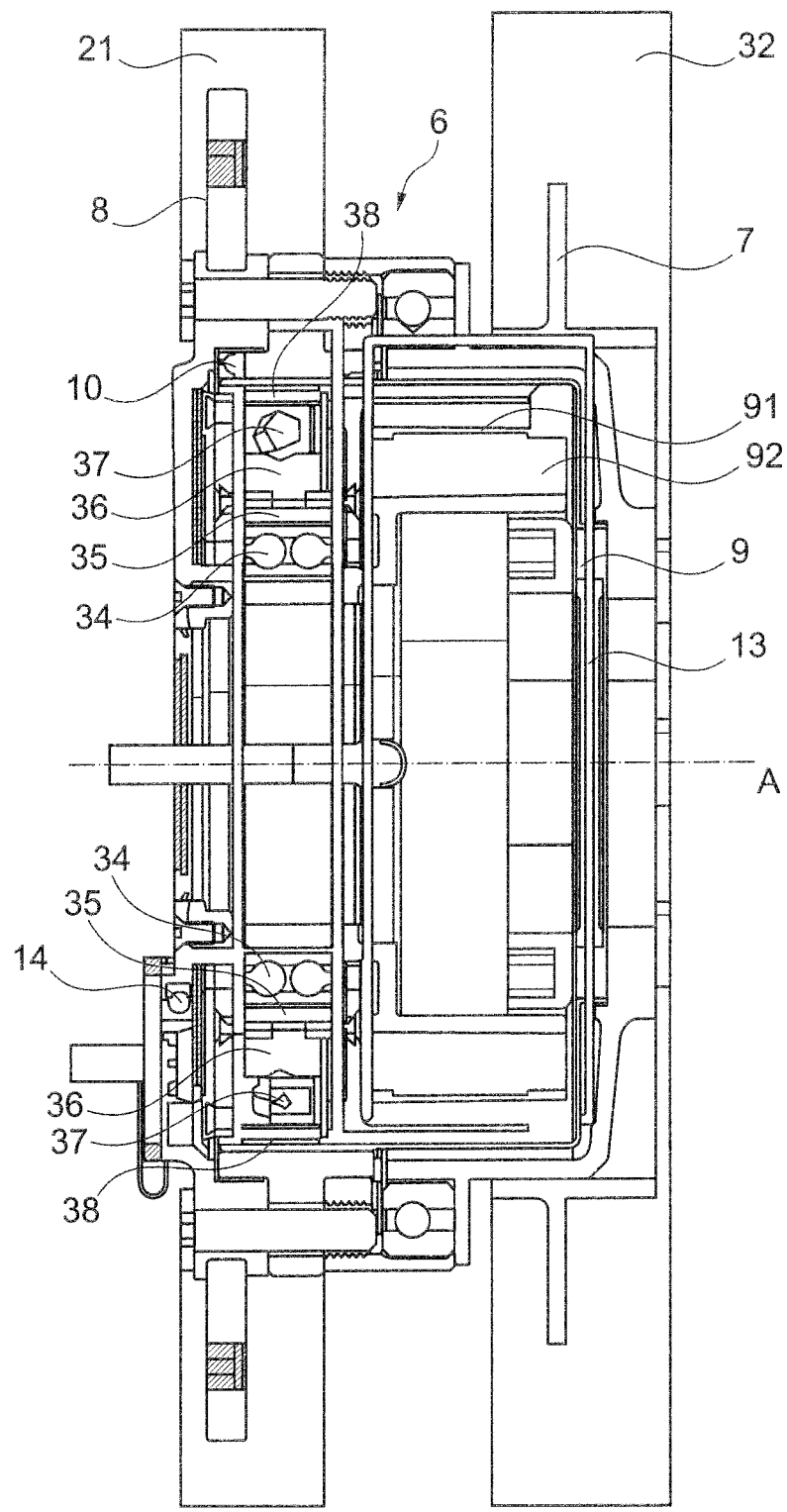
FIG. 2 shows a sectional illustration of a drive device of the baggage compartment from FIG. 1.

In FIG. 2, the drive device 6 is shown in more detail in a sectional view. The drive device 6 has a first flange 7 and a second flange 8, wherein the drive device 6, in the installation situation according to FIG. 1, is connected, in particular screwed, to the holder side wall 32 via the first flange 7 and to the first housing side wall 21 via the second flange 8.

The drive device 6 comprises a drive motor 9 having a rotor 91 and a stator 92. The drive motor 9 is designed as an external rotor motor, in which the rotor 91 rotates externally around the internal stator 92. The drive motor 9 is designed, as a torque motor, in particular as a permanently excited DC motor or as a multipole synchronous motor, to perform relatively high torques of approximately 5000 to 10 000 Nm at a relatively low rotational speed of approximately 50 to 200 rpm. One motor shaft, in particular the rotor of the drive motor 9, is designed as a hollow shaft and is arranged coaxially to the swivel axis A. As an external rotor motor, the stator is arranged in the hollow region of the rotor, wherein the stator is also designed as a hollow shaft. As a result, the drive motor 9 is designed in a hollow manner in the centre of the rotor and of the stator.

As an optional addition, the baggage compartment 1 has a passive mechanical axle, which extends through the hollow space in the rotor and the stator and couples the housing 2 to the baggage holder 3. As a result of the passive mechanical axle, the stability of the baggage compartment 1 can be increased.

The drive device 6 has a transmission 10 having an output shaft 36 which is designed as a hollow shaft and is arranged coaxially to the swivel axis A and to the motor shaft. Since the output shaft 36 also has a hollow space in the centre, the optional passive mechanical axles can also extend through the output shaft.

The transmission 10 is in the form e.g. of a harmonic drive transmission. The harmonic drive transmission comprises an elliptical steel disc mounted on a rolling bearing 34 as the drive shaft 35 and a thin-walled, deformable cylindrical steel bushing (flexspline) as the output shaft 36. The output shaft 36 has a flexspline 37.

The harmonic drive transmission comprises a rigid, rotation-free cylindrical outer ring 38 having a circular spline, wherein the outer ring 38 has more teeth than the output shaft 36. The output shaft 36 is deformed via the rolling bearing 34, as a result of which the flexspline 37 of the output shaft 36 engages with the circular spline of the outer ring 38 and meshes therewith when the drive shaft 35 is driven. The different number of teeth means that the output shaft 36 lags behind in line with the difference in teeth compared with a rotation of the drive shaft 35.

The transmission 10 is designed to convert the torques of the drive motor 9 and transmit them to the baggage holder 3, as a result of which said baggage holder performs the first or second swivel movement S1; S2. For example, the transmission 10 is designed to convert the torques in a ratio of 1/160.

In the installation situation according to the exemplary embodiment in FIG. 1, the drive motor 9 is directed at the baggage holder 3 and the transmission 10 is directed at the housing 2. Thus, the drive motor 9 also rotates when the baggage holder 3 performs the first or second swivel movement Ö; G.

The drive device 6 comprises a measuring device 13 in the form of a Hall-effect sensor for detecting the electrical motor current of the drive motor 9. The measuring results are transmitted by signals to the evaluation mechanism for evaluation. The evaluation mechanism infers a loading weight of the baggage items in the baggage holder 3 from the level of the motor current. The control mechanism 12 controls the speed of the drive motor 9 using the data acquired on the loading weight, so that the baggage compartment 1 is closed at a constant speed, even when there is a heavy load.

Depending on the calculated loading weight, the control mechanism 12 triggers the connection of the energy storage mechanism 11, which then releases its energy, particularly during the second swivel movement of the baggage holder 3, supports the second swivel movement S2 and thereby relieves the load on the drive motor 9. For example, the energy storage mechanism 11 is connected when a loading weight >25 kg is calculated, while the driving power for performing the second closing movement in particular, with a loading weight <25 kg is applied solely by the drive motor 9.

The maximum loading weight of the baggage holder 3 is reached with a loading weight of 50 kg. If it is established that the maximum loading weight has been exceeded, the control mechanism 12 triggers the issuing of an error message, e.g. to the display mechanism 16. As an optional addition, the control mechanism 12 stops the baggage holder 3 being driven by the drive motor 9 and possibly also the optionally connected energy storage mechanism 11.

The drive device 6 comprises a rotary encoder 14, which is in the form of an incremental encoder, for example, designed to detect an angle of rotation of the motor shaft. The measured angle of rotation is transmitted to the evaluation mechanism for evaluation, as a result of which an opening or closing angle of the baggage holder 3 is calculated. Depending on the opening or closing angle calculated, the control mechanism 12 controls the drive device 6 driving the baggage holder 3, until said baggage holder has reached the open or closed position Ö; G with positional accuracy. The locking mechanism 4, which transmits an electrical signal to the control mechanism 12 indicating that the baggage holder 1 is completely closed serves as the end limit stop in the closed position G.

REFERENCE NUMBER LIST

1 Baggage Compartment
2 Housing
3 Baggage Holder
4 Locking Mechanism
5 Control Mechanism
6 Drive Device
7 First Flange 8 Second Flange
9 Drive Motor
10 Transmission
11 Energy Storage Mechanism
12 Control Mechanism
13 Measuring Device
14 Rotary Encoder
15 Anti-trap Protection
16 Display Device
20 Housing Upper Side
21 First Housing Side Wall
22 Second Housing Side Wall
30 Holder Front Side
31 Holder Rear Side
32 First Holder Side Wall
33 Second Holder Side Wall
34 Rolling Bearing
35 Drive Shaft
36 Output Shaft
37 Flexspline
38 Outer Ring
91 Actuator
92 Stator
A Swivel Axis
G Closed Position
Ö Open Position
S1 First Swivel Movement
S2 Second Swivel Movement

What is claimed is:

1. A baggage compartment for an aircraft, comprising:
a housing and a baggage holder, wherein the baggage holder is swivel-mounted about a swivel axis in the housing,
wherein the swivel axis intersects, in its imaginary longitudinal extent, a holder side wall of the baggage holder and a housing side wall of the housing,
wherein the baggage holder is movable from a closed position into an open position with a first swivel movement to open the baggage compartment and wherein the baggage holder is movable from the open position into the closed position with a second swivel movement to close the baggage compartment,
wherein the baggage compartment comprises a drive device configured to drive the baggage holder during the first swivel movement to open the baggage compartment and the second swivel movement to close the baggage compartment,
wherein the drive device is connected to the holder side wall on one side and to the housing side wall on the other side,
wherein the drive device comprises a drive motor and a transmission operatively connected to the drive motor to convert a torque from the drive motor, wherein the drive motor has a motor shaft and the transmission has a drive shaft, both the motor shaft and the drive shaft being coaxial to the swivel axis.

2. The baggage compartment according to claim 1, wherein the drive motor comprises an external rotor motor.

3. The baggage compartment according to claim 2, wherein said external rotor motor comprises an external rotor torque motor.

4. The baggage compartment according to claim 1, wherein the transmission comprises a harmonic drive transmission.

5. The baggage compartment according to claim 1, wherein the baggage compartment has a passive mechanical axle which couples the housing to the baggage holder.

6. The baggage compartment according to claim 1, wherein the drive motor is directed at the baggage holder and the transmission is directed at the housing.

7. The baggage compartment according to claim 1, further comprising at least one energy storage mechanism, which is configured to store electrical energy supplied by a power source or kinetic energy output during the first swivel movement of the baggage holder and to release the electrical energy or the kinetic energy during the second swivel movement of the baggage holder, so that the power of the drive motor required to close the baggage compartment is reduced.

8. The baggage compartment according to claim 7, wherein the baggage compartment comprises a control mechanism.

9. The baggage compartment according to claim 8, wherein the control mechanism comprises a Programmable Logic Controller (PLC).

10. The baggage compartment according to claim 8, wherein the control mechanism triggers the energy storage mechanism, depending on a loading weight determined for the baggage holder, to release the stored energy during the second swivel movement of the baggage holder, thereby supporting the second swivel movement.

11. The baggage compartment according to claim 7, wherein the drive device comprises at least one measuring device for detecting the electric motor current, wherein the control mechanism comprises an evaluation mechanism for calculating a loading weight for the baggage holder using the electrical motor current.

12. The baggage compartment according to claim 11, wherein said at least one measuring device comprises a Hall-effect sensor.

13. The baggage compartment according to claim 11,
wherein the drive device comprises a rotary encoder configured to detect an angle of rotation of the motor shaft,
wherein the evaluation mechanism calculates an opening or closing angle for the baggage holder using the angle of rotation, and
wherein the control mechanism triggers the drive device, depending on the opening or closing angle, to drive the baggage holder during the first or second swivel movement until said baggage holder adopts the open position or the closed position with positional accuracy.

14. The baggage compartment according to claim 1, wherein the baggage compartment comprises at least one control mechanism to activate the baggage holder or is connectable to the baggage holder.

15. An aircraft comprising the baggage compartment according to claim 1.

* * * * *